(12) United States Patent
Hershbarger

(10) Patent No.: US 7,158,573 B2
(45) Date of Patent: Jan. 2, 2007

(54) METHOD AND APPARATUS FOR FULL DUPLEX SIGNALING ACROSS A TRANSFORMER

(75) Inventor: Russell Hershbarger, Nevada City, CA (US)

(73) Assignee: TDK Semiconductor, Irvine, CA (US)

( * ) Notice: Subject to any disclaimer, the term of this patent is extended or adjusted under 35 U.S.C. 154(b) by 239 days.

(21) Appl. No.: 10/857,469

(22) Filed: May 28, 2004

(65) Prior Publication Data

US 2004/0239487 A1 Dec. 2, 2004

Related U.S. Application Data

(60) Provisional application No. 60/474,009, filed on May 29, 2003.

(51) Int. Cl.
*H04B 3/00* (2006.01)
(52) U.S. Cl. .................. 375/258; 375/219; 375/319
(58) Field of Classification Search ........... 375/257, 375/258, 219, 319
See application file for complete search history.

(56) References Cited

U.S. PATENT DOCUMENTS 5,384,808 A * 1/1995 Van Brunt et al. ......... 375/257
5,506,900 A 4/1996 Fritz
5,654,984 A * 8/1997 Hershbarger et al. ....... 375/257

FOREIGN PATENT DOCUMENTS

GB          2 249 919 A    5/1992
WO      WO 81/00658 A     3/1981

* cited by examiner

*Primary Examiner*—Temesghen Ghebretinsae
(74) *Attorney, Agent, or Firm*—The Hecker Law Group, PLC

(57) ABSTRACT

Simultaneous bi-directional communication of digital signals across an isolation barrier, such as a pulse transformer, is presented. On the pimary side of the barrier, a voltage driver drives a digital transmit data stream, that is encoded to be DC balanced in both current and voltage domains, across the barrier. On the secondary side, an impedance switching circuit modulates the load impedance of the voltage driver in accordance with a digital receive data stream. The modulation of the load impedance is detected on the primary side by sampling the sourced current of the voltage driver to extract the digital receive data. The voltage driver may be sampled at predictable points in time when the current it is sourcing is primarily dependent upon the load impedance of the secondary side. Alternatively, the magnetizing inductance current of the isolation barrier can be subtracted from the current sourced due to the known transmit data.

19 Claims, 17 Drawing Sheets

METHOD AND APPARATUS FOR FULL DUPLEX SIGNALING ACROSS A TRANSFORMER

CROSS REFERENCE TO RELATED APPLICATIONS

This application claims priority from U.S. Provisional Application No. 60/474,009 filed on May 29, 2003, the specification of which is herein incorporated by reference.

BACKGROUND OF INVENTION

1. Field of the Invention

This invention relates to the field of telecommunications. More specifically, the invention relates to communication across a transformer.

2. Background

An isolation barrier is generally used in applications in which it is desired to keep voltage potentials in one portion of a circuit separate from voltages in another portion, e.g., to prevent relatively excessive and/or harmful voltages from entering a relatively low voltage or voltage sensitive circuit. Such applications may include, for example, telephony, medical, industrial, and other similar applications.

For example, in a telephony application, it may be necessary to protect communication circuitry from high voltages on the telephone line by placing an isolation barrier between the communication circuitry and the telephone line. However, while it is desirable to prevent harmful voltages from crossing from one side of an isolation barrier to the other, it is also desirable to facilitate signal communication between circuits on both sides of the barrier. In telephony applications, the isolation requirement is generally imposed by some governmental requirement (e.g., FCC part 68 in the US).

The transformer is one of several types of electrical devices that may be used as an element of an isolation barrier. However, digital communication across a transformer in the prior art generally requires either a pulse transformer for each direction of communication, or time domain multiplexing of a pulse transformer (i.e., half-duplex communication). Prior art systems are incapable of full-duplex digital communication across a single transformer.

In practice, most prior art systems that are capable of bi-directional communication across a single isolation barrier element require a "flagman" to control the direction of communication. For example, if communication is occurring from the line-side to the host-side of the isolation barrier, a flag signals the sending side (line) driver to transmit while signaling the receiving side (host) driver to enter an inactive, high impedance state. For host-side to line-side communication, it is the line-side driver that is inactive.

Half-duplex communication in this manner reduces communication bandwidth as each direction of communication must wait its turn to use the one-way signal channel. However, the use of multiple transformers to achieve two-way communication is expensive in terms of cost and space. It would be much more desirable and advantageous to have a system that provides simultaneous bi-directional communication of signals across a single transformer.

SUMMARY OF INVENTION

The invention provides a method and apparatus for full-duplex communication across a transformer. In one embodiment, bi-directional communication across a transformer may be accomplished by driving a first communication signal (referred to herein as "transmit data") across the transformer from a first side (e.g., the primary) to achieve communication in a first direction, and modulating the load impedance on the second side (e.g., the secondary) in accordance with a second communication signal (referred to herein as "receive data") to achieve communication in the reverse direction.

In one embodiment of the invention, the digital bit stream of the transmit data may be encoded to provide DC balancing of both current and voltage characteristics (also referred to herein as "double-balancing"). Given a double-balanced encoding scheme for the driven signal, the system may exhibit predictable points in time when the current sourced by the transmit data signal driver (e.g., a low impedance voltage driver) is primarily dependent upon the modulated load impedance (as opposed to having a strong magnetizing inductance current component). A current sensor may sample the sourced current at those predictable instances in time to detect the impedance modulation and thus recover the receive data from the other side of the barrier.

In another embodiment, the magnetizing inductance current may be predicted during data transmission, based on the known transmit data, allowing the magnetizing inductance current to be canceled out. Receive data may be recovered by detecting the load impedance modulation from the remaining source current. Hence, full-duplex data transmission may be achieved.

Encoding the transmit data with two levels of DC balance, one for the voltage domain and one for the current domain, may be achieved by any DC-balanced coding technique or combination of techniques. The two-level balancing may be performed in stages (consecutive or otherwise), or may be performed in a single multi-level balanced encoding process. In one embodiment of the invention, a DC-balanced 3-bit to 4-bit block encoder followed by Manchester encoding may be used to generate an appropriately balanced signal. Consideration for selection of an appropriate encoding scheme may depend on such design tradeoffs as droop time versus worst-case code spacing and signal bandwidth.

Advantages of the present invention include concentration of design complexity on the primary side of a transformer, allowing the secondary (usually floating) side circuitry to be simply designed and have minimal power requirements. For instance, the impedance switching circuit on the secondary side may be implemented with a simple switch that draws very little power. Additionally, because it is possible to maintain continuous time recovery of data (as opposed to a half-duplex hand shaking requirement), components on both sides of the barrier may remain synchronous, simplifying system timing.

DETAILED DESCRIPTION

A method and apparatus for full-duplex digital communication across a transformer are described. In the following description, numerous specific details are set forth to provide a more thorough description of embodiments of the invention. It will be apparent, however, to one skilled in the art that the invention may be practiced without these specific details. In other instances, well known features have not been described in detail so as not to obscure the invention.

Embodiments of the present invention provide simultaneous bi-directional communication across a transformer, as might be used, for example, in an isolation barrier. Signal communication across an isolation barrier is generally useful for telephony, medical, industrial, and other applications wherein it is desired to separate voltage potentials. In telephony applications, the isolation requirement is generally imposed by some governmental requirement (e.g. FCC part 68 in the US). Although the discussions herein are concentrated on telephony applications, it should be apparent to those of skill in the art that the principles expounded herein are applicable to other applications wherein communication across a transformer is desired.

Implementation Example: DAA Embodiment

In telephony applications, communication devices (e.g., computers, fax machines, etc.) typically connect to the PSTN (public switched telephone network) through modem devices to send and receive signals over the telephone lines. A DAA circuit (data access arrangement) provides the interface between the modem device and the telephone lines, including the isolation barrier. The DAA may be described in terms of a "line side" (i.e., that portion of the circuitry that couples to the telephone line), a "host side" (i.e., that portion of the circuitry more closely associated with the host device; also referred to as the "modem side" or "DSP side"), and an isolation barrier that separates the line side and the host side. The isolation barrier may include one or more isolation elements, as well as one or more isolation element types (e.g., transformers, capacitors, optical couplers, etc.).

Embodiments of the invention are well suited to function as the isolation barrier, or an element thereof, in DAA circuits. Hence, the embodiments described below are primarily discussed within the context of a DAA circuit for illustration purposes. It will be understood that the present invention is not limited to such DAA circuit applications, nor even to isolation barriers in general.

Figure 1:
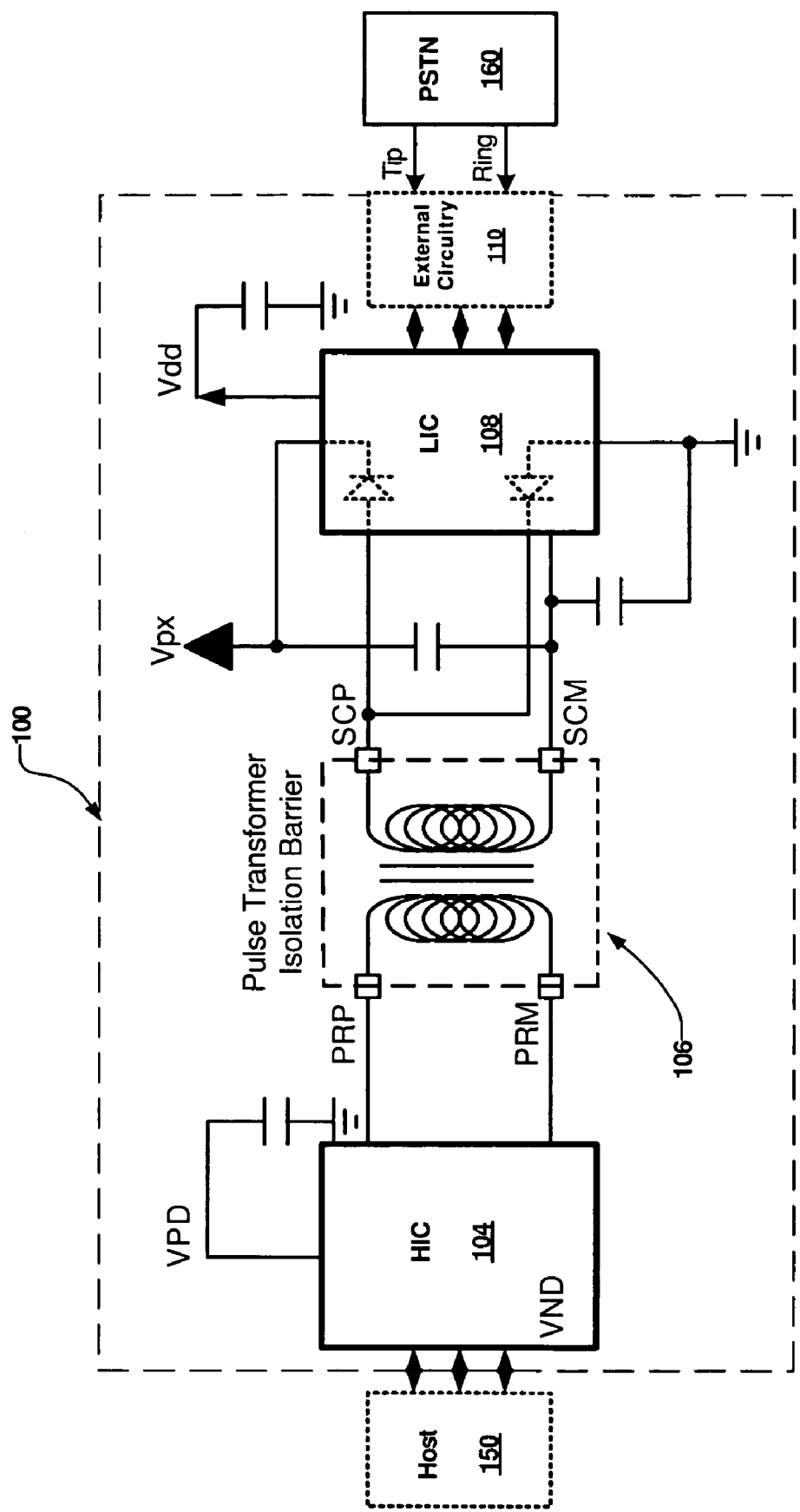
FIG. 1 is block diagram of a modem Codec DAA (data access arrangement) connecting a host/DSP to a public switched telephone network in accordance with an embodiment of the present invention.

FIG. 1 is a block diagram of a modem DAA connecting a Host/DSP to a PSTN, in accordance with an embodiment of the present invention. In this illustration, DAA 100 connects Host Computer 150 to PSTN 160 via the "tip" and "ring" lines of the telephone network. DAA 100 comprises Host Interface Component (HIC) 104; Isolation Barrier 106; Line Interface Component (LIC) 108; and External Circuitry 110. HIC 104 interfaces the DAA functions with Host 150. Host 150 may include, for example, a DSP, personal computer, or similar device.

External Circuitry 110 provides circuitry for connection of the DAA to PSTN 160. Typically, the PSTN signal is analog in nature. The analog information from the PSTN may be converted to digital information in LIC 108 before transmission across Isolation Barrier 106 to HIC 104. In one embodiment, Isolation Barrier 106 comprises a pulse transformer.

In telephony applications, analog voice band signals (e.g., 300 Hz–3.6 KHz) on the phone line may be converted to digital data in LIC 108 using suitable modulation/demodulation techniques (e.g., at the rate of 1.536 Mbps for an 8 kHz sampling rate). The generated digital data may be time-division multiplexed with status and other information to form an effective transfer rate that may be higher than the bit rate of the digital data (e.g., 2.048 Mbps), and may be sent across the transformer of Isolation Barrier 106. HIC 104 may subsequently demultiplex the received bit stream into the various components, e.g., voice band signal, status, and other information. HIC 104 may digitally filter the voice band signal, decimate (or demodulate) the voice band signal to extract the original voice band information, and then send the extracted digital voice band data (e.g., in 16-bit samples) to Host 150.

In the other direction (i.e., transmission from Host 150 to PSTN 160), HIC 104 may receive digital information from Host 150 for transmission to PSTN 160. HIC 104 may receive the digital information in the form of a digital data stream or other form (e.g., 8-bit data at 16 kHz) from Host 150 and may serialize it using appropriate modulation techniques to a bit stream of appropriate rate, e.g., 1.536 Mbps. In accordance with an embodiment of the invention, an encoding scheme may be used to maintain DC-balanced current and voltage characteristics within the signal driven across the transformer of Barrier 106, thus raising the actual data transfer rate across the barrier to the full transfer speed, for example, 2.048 Mbps. The digital bit stream is then received by LIC 108.

In embodiments of the invention, communication across Isolation Barrier 106 may be performed in full-duplex. In addition to the data communicated across the barrier, other information such as control, clock, power, status, and other information may be sent across the barrier. For instance, information needed to reconstruct the HIC clock in LIC 108 may be embedded in the bit stream sent across the barrier from HIC 104.

In one embodiment, HIC 104 may provide power needed by LIC 108 while the phone line connection is "on-hook." However, after the phone line connection goes "off-hook," LIC 108 may be entirely line powered and float on the "high voltage" side of the PSTN network, if power is available from the telephone line. Other embodiments may support a "4-wire leased line" mode, in which power is always sent across the barrier, requiring no power from the line.

In one embodiment, a serial data port may be provided for transferring "receive" data and status information from HIC 104 to Host 150 and "transmit" data and control information from Host 150 to HIC 104.

In the descriptions that follow, the primary side of transformer 106 is connected to HIC 104 and the secondary side of transformer 106 is connected to the LIC 108 for consistency in description. It should be apparent to those of skill in the art that other arrangements are also possible. In addition, "forward direction" refers to data and control bits driven onto the primary by the HIC drivers. Clocking and power may also be provided in the forward direction. The "reverse direction" is data received by HIC 104 from across Barrier 106.

Pulse transformer 106 may have, for example, a 1:1 (PRI:SEC) winding ratio. However, it should be apparent to those of skill in the art that the transformer ratio is in no way constrained to those discussed herein.

The pulse transformer has advantages over other types of isolation elements. For instance, advantages of a pulse transformer over a capacitor as the isolation element include lower cost Bill of Materials (BOM); lower component count BOM; and better common mode noise immunity. In addition, it may be easier to send power across a transformer with minimum loss (e.g. HIC 104 sending power across to LIC 108) while the phone line connection is "on-hook."

Figure 2:
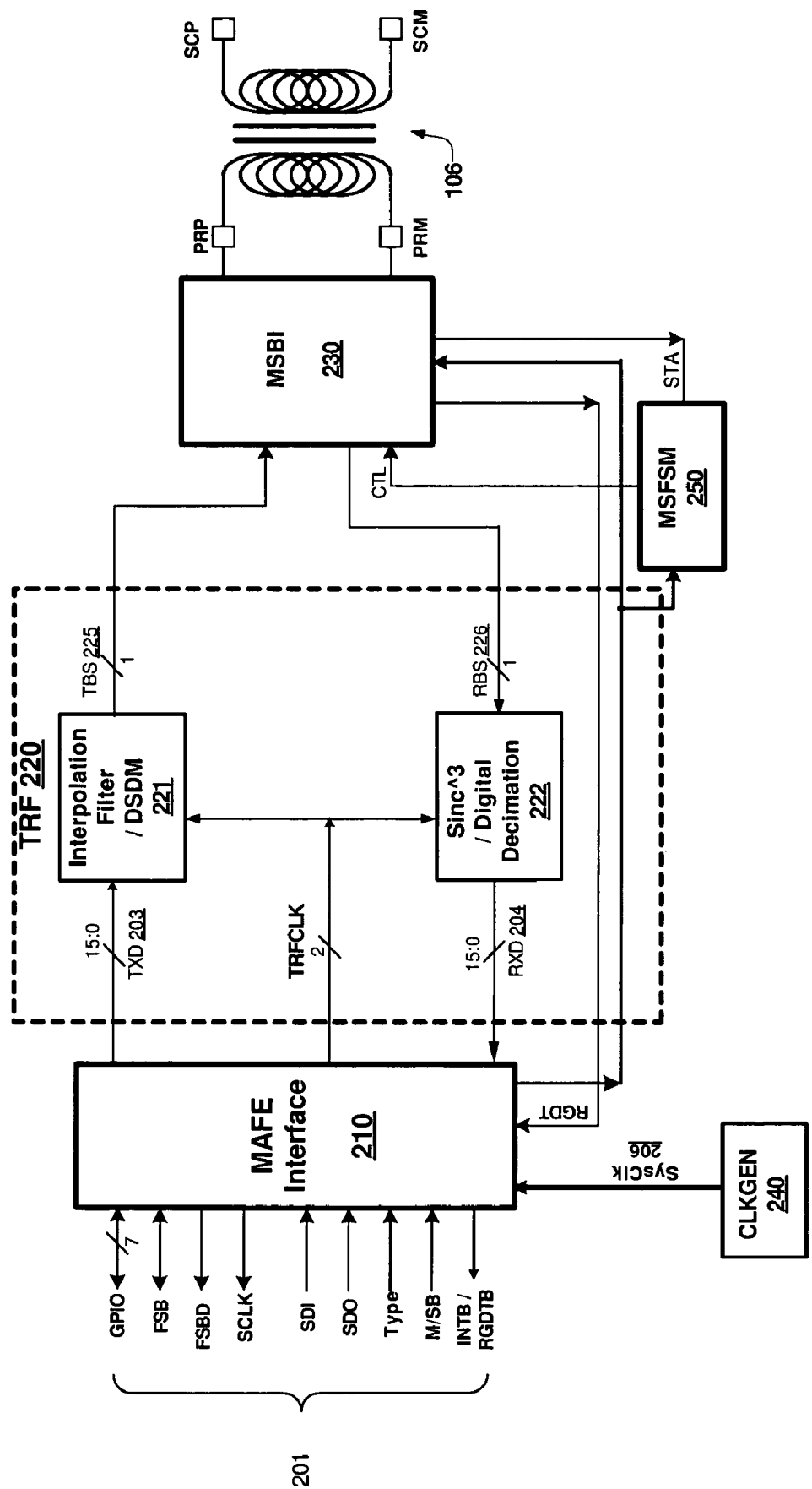
FIG. 2 is a block diagram of a Host Interface Component in accordance with an embodiment of the present invention.

FIG. 2 is a block diagram of an embodiment of Host Interface Component 104, in accordance with an embodiment of the present invention. In the illustrated embodiment, HIC 104 may include, for example, Modem Analog Front End (MAFE) 210; Transmit and Receive Filters (TRF) 220; Modem Side Barrier Interface circuit (MSBI) 230; Modem Side Barrier Interface Finite State Machine (MSFSM) 250; and Clock Generation Circuit (CLKGEN) 240.

MAFE Interface 210 may provide a bi-directional data port that can be configured to support most DSP's or similar processing units with which it may interface. MAFE 210 may be a configurable serial data port or a parallel data port, for example. MAFE 210 provides an interface between HOST 150 and DAA 100. In the present illustration, only representative interface signals are shown. For instance, in an embodiment where MAFE 210 is a configurable serial data port, the external communication lines may include signals 201, which comprise: a 7-bit General Purpose Input/Output (GPIO) interface; Frame Synchronization Bit (FSB); delayed FSB (FSBD); Serial Interface Clock (SCLK); Serial Data Input (SDI); Serial Data Output (SDO); type of frame (Type) indicator; Master/Slave Control bit (M/SB); and Ring Detection/Interrupt Bit (INTB/RGDTB). Signals 201 may be configured as external pins of the DAA device.

Signals TXD 203 and RXD 204 may be configured as internal signals of a predetermined width (e.g., 16 bits wide). In this illustration, TXD 203 is input to Interpolation Filter/DSDM (digital sigma-delta modulator) module 221 and RXD 204 is output from Sinc^3/Decimation module 222. In addition, clock signals TRFCLK 205 for Interpolation Filter/DSDM 221 and Sinc^3/Decimation module 222 may be derived within MAFE 210 from the system clock (SysClk 206) generated in CLKGEN 240.

Interpolation Filter/DSDM 221 receives digital data, TXD 203, from MAFE 210, processes the digital data through interpolation filters, as necessary, and/or through an oversampling quantizer (e.g., digital sigma-delta modulator) to generate transmit bit stream (TBS) 225, which is coupled to MSBI 230 for transmission over the barrier. It should be apparent to those of skill in the art that sigma-delta modulation (also known as delta-sigma modulation) is merely one possible method by which a one-bit data stream may be generated. The present invention is in no way limited in the mechanism by which the one-bit data stream originates.

In one or more embodiments, the transmitter begins with a transmit interpolation filter (TIF)(e.g., a 48-tap filter) that takes in 16-bit data, for example, from the SDI interface at a certain rate, for example, 8 kHz. The TIF up-samples (e.g., interpolates) the data to a desired rate (e.g., 16 kHz), rejecting data images at multiples of the input rate that exist in the original TXD 203 data stream, and outputs a 16-bit data stream to a digital sigma-delta modulator. TXD 203 input data and the output of the TIF process may be, for example, two's compliment numbers in one or more embodiments.

The sampling nature of the TIF may lead to an additional filter response that affects the in-band signals. The response of a suitable TIF may be in the form of sin(x)/x which may be expressed as $$20*\log\left[(\sin(PI*f/fs))/(PI*f/fs)\right],$$

where f is the input signal frequency (e.g. 8 kHz) and fs is the sample frequency (e.g. 16 kHz).

The digital sigma-delta modulator (DSDM) takes the output of the transmit interpolation filters, which may comprise 16-bit two's compliment numbers, as input and generates a bit stream that feeds into MSBI 230 for time-multiplexing with control data and double-balanced encoding prior to transmission across the barrier to LIC 108.

In the receive direction, encoded data that is transferred over the barrier (i.e., using impedance modulation) from the LIC 108 to MSBI 230 for decoding and separation into data and status. The data portion (RBS 226) may be fed to one or more digital filters (e.g., Sinc^3 filters). Each Sinc^3 filter has a $[\sin(x)/x]^3$ frequency response. The Sinc^3 filters may be synchronized so that there is one sample available at the desired output rate (e.g., 16 kHz). In one embodiment, the output of the Sinc^3 filter is a 17-bit, two's compliment number representing the amplitude of the input signal. The Sinc^3 filter, by virtue of a holding action (i.e., between sample periods), introduces a droop in the passband that may be corrected later by a FIR (finite impulse response) filter, such as a decimation filter.

In one embodiment, the output of the Sinc^3 filter is input to another digital FIR filter that provides a passband amplitude correction to the output of the Sinc^3 filter, as well as rejecting noise above a certain frequency (e.g., 4 kHz). The output of this filter may be decimated to provide the final output data, RXD 204, which may be 16-bit, two's compliment samples at the desired rate (e.g., 8 kHz). RXD 204 is then transmitted to MAFE 210 for subsequent processing and transmission to Host 150.

MBSI 230 provides the interface functionality of the HIC with the isolation barrier for communication with LIC 108. In addition to other functions, the MSBI 230 manages all of the required signaling across the barrier by: appropriately encoding TBS 225 and Control Signal (CTL) and transferring the encoded signal across the barrier; appropriately decoding RBS 226 and Status information(STA) from the LIC 108; sensing the presence of coarse ring detect from the LIC 108 and informing the Modem Side Barrier Interface Finite State Machine (MSFSM) 250;.and generating proper amplitude pulses to transfer power to LIC 108 when necessary. The MSFSM 250 is a state machine that controls the functions of MSBI 230 and generates the Control Signal, CTL, that is transferred across the barrier to LIC 108.

Figure 9:
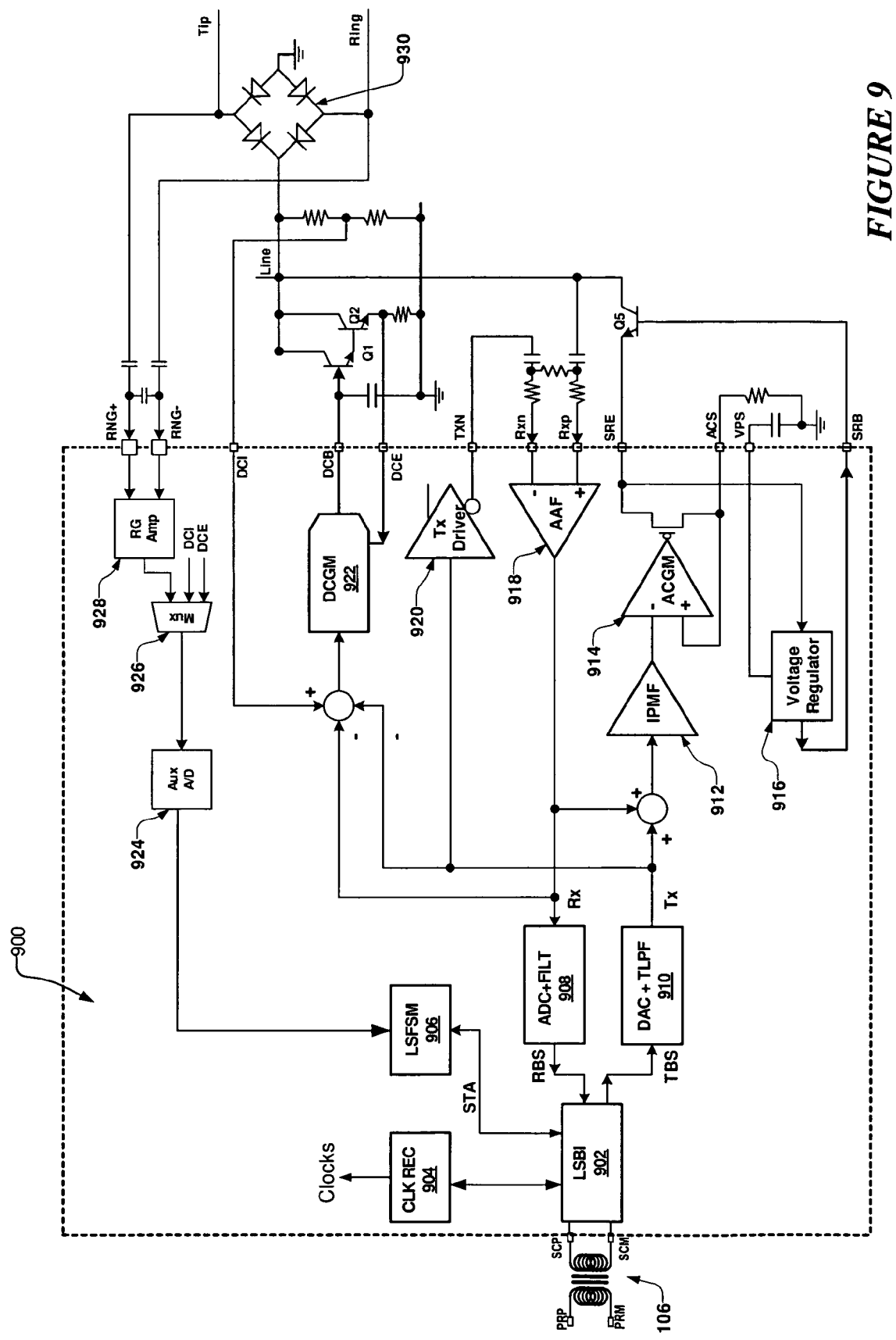
FIG. 9 is a block diagram of a Line Interface Component in accordance with an embodiment of the present invention.

Referring back to FIG. 1, the telephone line side of an embodiment of the present invention comprises LIC 108 and External Circuitry 110. The functionality of the LIC 108 and External circuitry 110 are further illustrated in FIG. 9. As illustrated, LIC 108 comprises circuitries enclosed in block 900. All other circuitry, excluding the barrier transformer, may be part of the external circuitry 110 in an embodiment of the present invention.

LIC 108 comprises Line Side Barrier Interface (LSBI) 902; Clock Recovery circuit (CLK REC) 904; Line Side Finite State Machine (LSFSM) 906; Analog-to-Digital Converter block (ADC+FILT) 908; Digital-to-Analog Converter block (DAC+TLPF) 910; AC Impedance Matching Filter (IPMF) 912; AC Termination Filter (ACGM) 914; Voltage Regulator 916; Anti-Aliasing Filter (AAF) 918; Transmit Driver 920; DC Termination Filter (DCGM) 922; Auxiliary A/D 924; Multiplexer 926; and Ring Amplifier 928.

In one embodiment, the analog signal from the telephone line (Tip and Ring) is conditioned through Rectifier 930 to eliminate any polarity issues. Rectifier 930 may be of the passive or active type. In an embodiment where Rectifier 930 is active, its functions may be included within block 900 and power for the active components may be obtained from across the barrier from HIC 104, for example. Other configurations of rectifier 930 are also possible.

The positive terminal of Rectifier 930 is AC coupled through the Rxp input of block 900 to the positive terminal of AAF 918. As illustrated, AAF 918 may comprise one or more filters and amplifiers. The AAF 918 filters may be active, passive, or a combination of both. The negative terminal, Rxn, of AAF 918 is AC coupled to the negative output, TXN, of differential transmit driver 920 for transmit cancellation.

AAF 918 sums the receive signal, Rxp, with a portion of transmit signal, TXN, to reduce the transmit signal component in the receive path. This is accomplished by feeding the transmit signal to Rxn input pin of block 900 which is coupled to the negative terminal of AAF 918. Typically, some Trans-Hybrid Loss (THL) is expected (.e.g 10 dB). Also, the extent of the cancellation would generally depend on the AC impedance matching of the device to the line.

The analog output of the AAF 918 is coupled to ADC+FILT 908 for conversion to the receive bit stream, RBS. In ADC+FILT 908, the analog input signal may additionally be filtered to fulfill some special requirements, e.g., a low pass Notch Filter to attenuate the German Billing Tone. After filtering, as necessary, the signal is then digitized by an analog to digital converter, e.g., a delta-sigma modulator, to generate the receive bit stream, RBS. The resulting high frequency one-bit data stream (RBS) is sent to LSBI 902 for encoding and eventual transmission across the barrier to HIC 104.

DCGM 922 provides necessary DC termination, DCB, by monitoring the input voltage from the telephone line (DCI), and the DC loop current sense (DCE).

On the transmit side, the transmit bit stream received from across the barrier by LSBI 902 is processed through Digital to Analog Converter and Filter block (DAC+TPLF) 910 to generate the analog transmit signal Tx. The received signal from AAF 918 (e.g., Rx) is summed with the transmit signal and then coupled to AC impedance matching filter (IPMF) 912. Proper AC termination may be provided by ACGM 914. ACGM 914 provides AC termination by monitoring the AC current, ACS, and the AC output of the impedance matching filter, IPMF 912. ACGM 914 circuit drives the line as a transconductance amplifier. Its input signal is converted to current by impressing it across an external resistor (e.g. 400 Ohms).

In one or more embodiments, an auxiliary analog to digital converter, Aux A/D 924, may be used for coarse ring detect by coupling the Tip and Ring terminals from the telephone line to the RNG+ and RNG− input terminals of block 900, after DC filtering. The tip and ring inputs are coupled as differential inputs to amplifier 928 and then multiplexed with the line sensing signals, DCI and DCE, for conversion in Aux A/D 924.

Output of the Aux A/D 924 may then be coupled to Line Side Finite State Machine (LSFSM) 906 for controlling the states of the block 900.

In one embodiment, the LIC 108 continuously monitors the line through auxiliary A/D 924 and sends the converted raw data to the HIC 104 over the barrier. HIC 104 then interprets the data for appropriate decisions in controlling the DAA device. For instance, Caller ID, Line-in-Use, Parallel Pick-up, polarity reversal, etc., may be available from the line sensing signals, DCI and DCE.

Full-Duplex Signaling Over the Transformer

To understand the functions of MSBI 230 and LSBI 902, it is necessary to discuss the general concept of transferring data bi-directionally and simultaneously (e.g. full duplex) across the isolation barrier in accordance with one or more embodiments of the present invention.

Figure 3A:
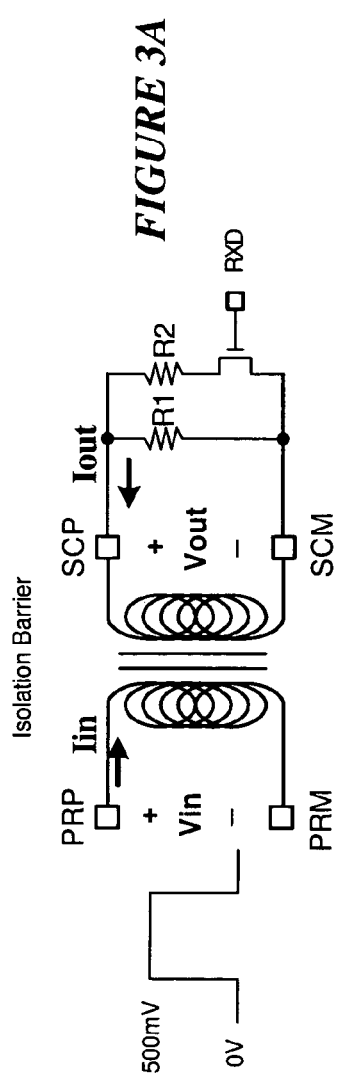
FIG. 3A is a circuit diagram of a transformer drive scheme in accordance with an embodiment of the present invention.
Figure 3B:
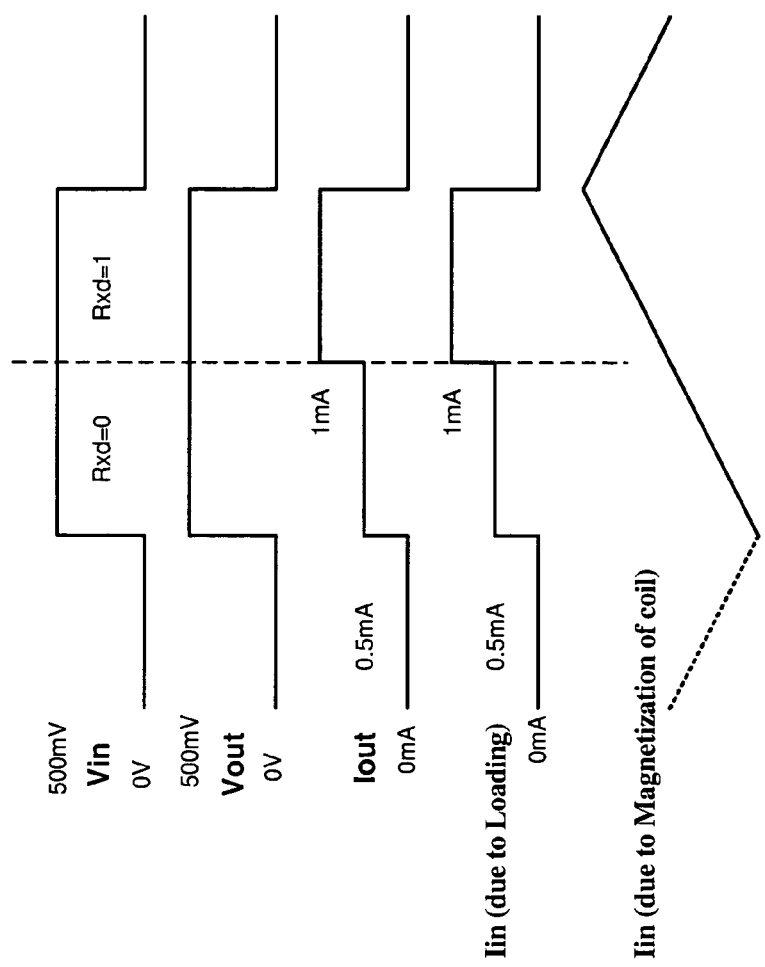
FIG. 3B is a signal diagram of the circuit of FIG. 3A, in accordance with an embodiment of the present invention.

FIGS. 3A and 3B provide illustration of the basic concept involved in the bi-directional data transfer across a pulse transformer. FIG. 3A is an illustration of a transformer drive scheme in accordance with an embodiment of the present invention. FIG. 3B shows the transformer voltage and current values Vin, Vout, Iin and Iout, when a voltage signal is driven across Vin. In this illustration, PRP and PRM are the positive and negative terminals on the primary side of the pulse transformer, respectively. Similarly, SCP and SCM are the positive and negative terminals on the secondary side of the pulse transformer, respectively.

In operation, transmit data, in the form of input voltage Vin, is driven across the primary side of the transformer. Assuming a 1:1 winding ratio, mutual inductance causes the input voltage to be induced across the output terminals of the secondary as Vout. As a consequence, output current Iout flows through the loading resistor R1 (e.g., 1 k$\Omega$). Since magnetic flux in a transformer cannot change immediately, input current, Iin, will flow into the primary side simultaneously.

By turning on the switch controlled by RXD (see portion of waveforms in FIG. 3B labeled "Rxd=1"), and hence placing resistor R2 in parallel with resistor R1, the load impedance changes to the equivalent impedance of two resistors in parallel. For example, if R1 and R2 are each 1 k☐, then the equivalent impedance is 0.5 k☐. Components of Iout and Iin dependent on the loading also change as the impedance changes. For instance, if the load current is 0.5 milliamps with only R1 as the load impedance, then the load current will double to 1.0 milliamp when R2 is switched on (i.e. R1=R2=1 k☐). Thus, by sensing the load current via Iin, an embodiment of the present invention can detect the impedance changes on the primary side and extract the receive data (RXD) responsible for those changes (i.e., by controlling the switch).

Note that, except for power dissipated in activating the switch, all power for signal transfer is derived from the primary side.

In operation, Iin is subject to a magnetization inductance component, in addition to the load current. For accurate detection of the impedance modulation, the Iin component due to the load may be isolated from the magnetizing inductance current of Iin. Embodiments of the invention isolate the loading current from the magnetizing current by applying a transmit data encoding scheme that is double DC balanced, i.e., balanced in both current and voltage. Double-balancing induces behavior in the magnetizing inductance current that is predictable from the known transmit data.

Figure 4:
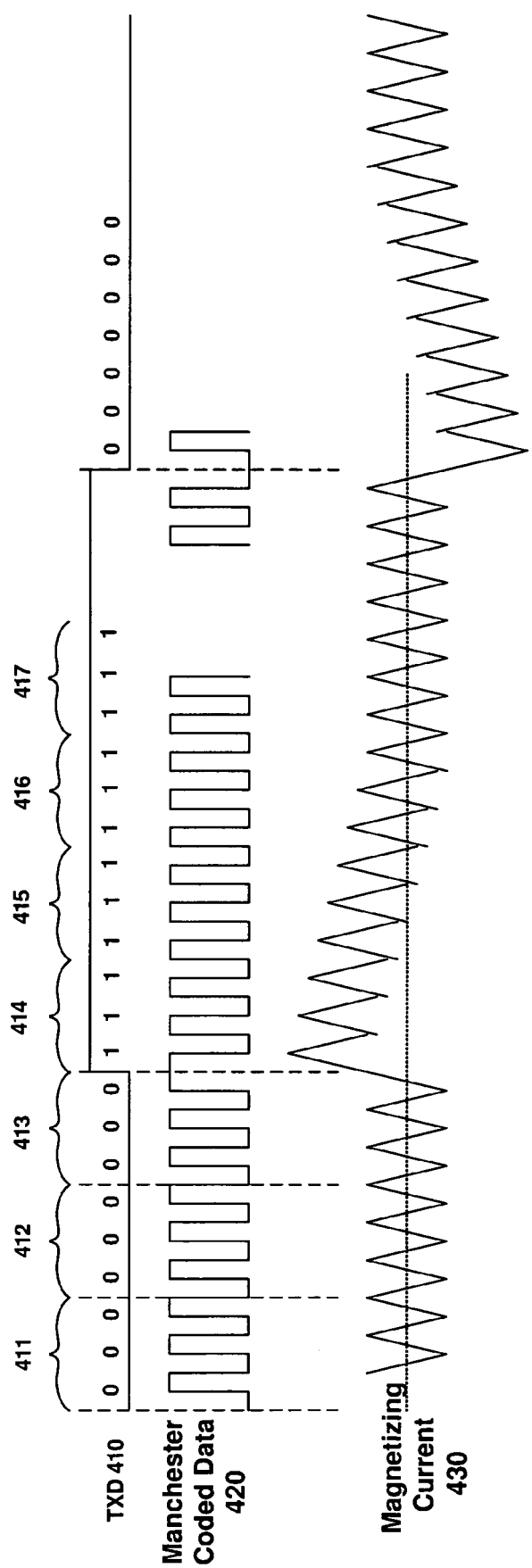
FIG. 4 is a signal diagram illustrating the effect of a single-balanced data signal on magnetizing current.

FIG. 4 provides an example of a transmit data stream that is not double-balanced, with the corresponding ill-behaved magnetizing current. In this example, transmit data TXD 410 is Manchester encoded (single balance) to generate coded data 420, which is driven across the transformer. As a result, magnetizing current 430 is generated. In this illustration, the magnetizing current 430 is affected by the data pattern-dependent DC shift, resulting in less predictable magnetizing current behavior. This makes the process of isolating load current from magnetizing current difficult.

To solve the problem of unpredictable magnetizing current, double DC balancing of the transmit signal may be enforced through data encoding. Double DC balancing requires that the transmit signal be balanced in both current and voltage. This may be established, for example, by applying multiple single-balanced encoding processes to the transmit data (in sequence or otherwise). For example, Manchester encoding (i.e., 1 b/2 b) applied twice to the transmit signal will result in a double-balanced data stream. In other embodiments, a single encoding process may be implemented that provides DC balancing of both current and voltage characteristics.

The impact of specific balancing block codes on transmission bandwidth, circuit complexity, and decay time of the encoded signal may be considered in selecting a particular encoding scheme. For instance, using two Manchester encoders (1-bit to 2-bit encoding) in series would result in the use of four times the original transmission bandwidth. In contrast, using a 7 b/8 b encoder may result in an unnecessarily complex circuit. In one or more embodiments of the present invention, a DC balanced 3 b/4 b encoder is applied in series with a Manchester encoder to provide predictable magnetizing current with relatively moderate increases in bandwidth use (× 2.67) and circuit complexity.

Figure 5:
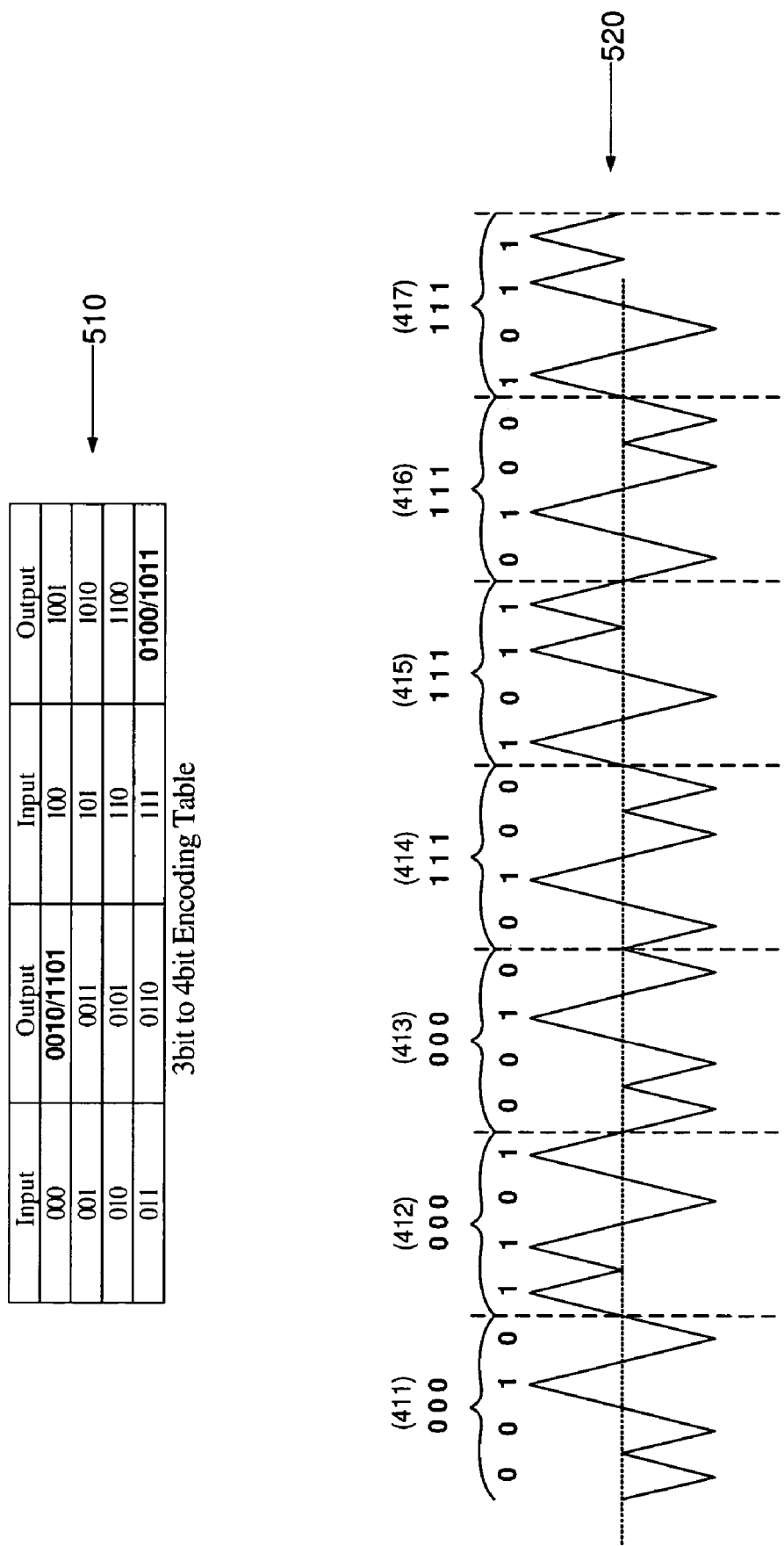
FIG. 5 is a signal diagram illustrating the behavior of the magnetizing current after transmit data is processed through a 3 bit to 4 bit encoder in accordance with an embodiment of the present invention.

FIG. 5 is an illustration of the behavior of the magnetizing current after TXD 410 is processed through a 3 bit to 4 bit encoder in accordance with an embodiment of the present invention. In this illustration, a DC-balanced 3 bit to 4 bit encoding scheme is shown in table 510, and the resulting magnetizing current is shown in waveform 520. As is illustrated in table 510, a 4 bit data scheme has only six code words available that are DC balanced as follows: "0011"; "0101"; "0110"; "1001"; "1010"; and "1100". Thus, in the 3 bit to 4 bit encoding scheme of an embodiment of the present invention, these six balanced code words are assigned one ("001") through six ("110") of the three input bits, and the remaining two input words, zero ("000") and seven ("111") are encoded to alternate between two unbalanced 4 bit words that average to DC-balanced words, e.g., "000" may be encoded to alternate between "0010" and "1101", while "111" may be encoded to alternate between "0100" and "1011".

As illustrated in waveform 520, the encoding of each three-bit group (411, 412, 413, 414, 415, 416, and 417) of transmit data to a DC balanced four bits results in a balanced and predictable magnetizing current 520. Thus, it is the function of MSBI 230 to provide DC balanced current of the transformer drive.

Figure 6:
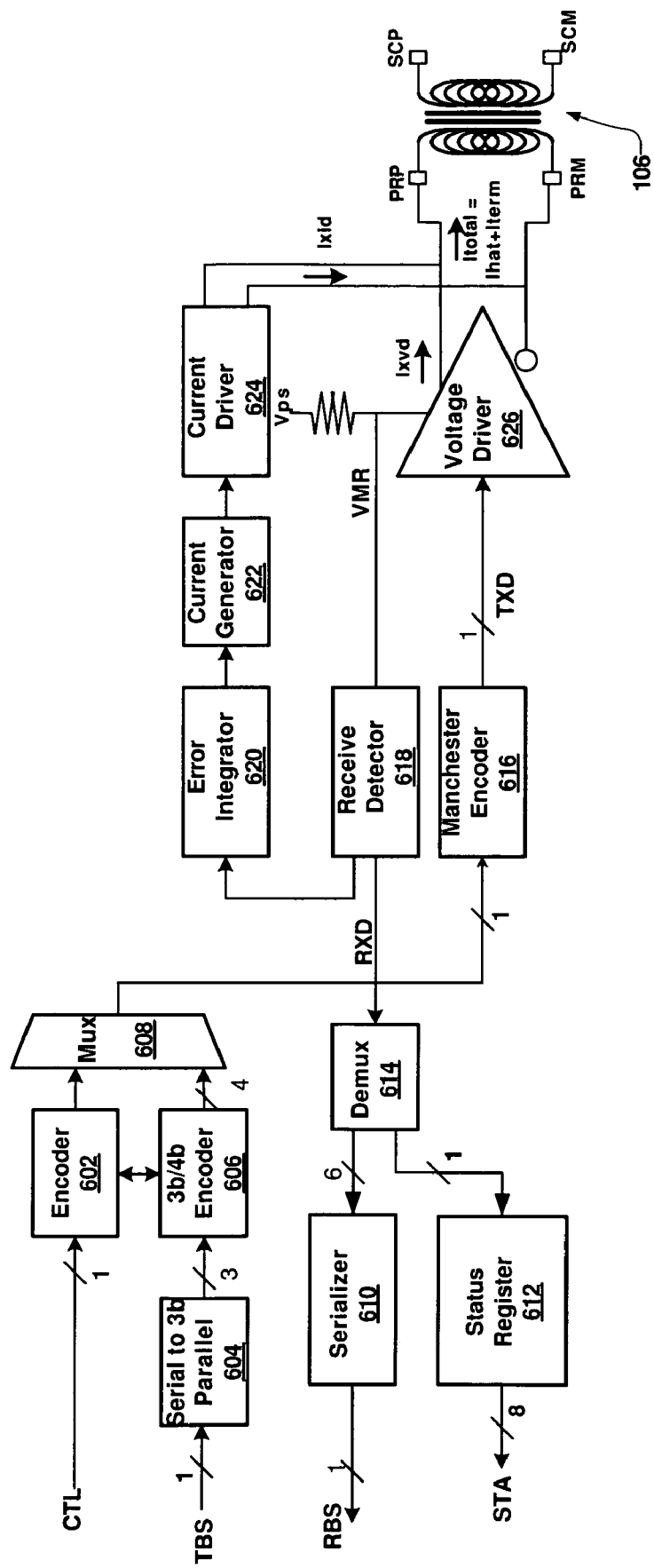
FIG. 6 is block diagram of a Modem Side Barrier Interface in accordance with an embodiment of the present invention.

Now referring back to MSBI 230 of the DAA circuit example, FIG. 6 illustrates a Modem Side Barrier Interface in accordance with an embodiment of the present invention. As shown, MSBI 230 may comprise Control Encoder block 602; Serial to 3-bit Parallel Encoder block 604; 3 b/4 b Encoder block 606; Multiplexer 608; Serializer 610; Status Register 612; Demultiplexer 614; Manchester Encoder 616; Receive Detector 618; Error Integrator 620; Current Generator 622; Current Driver 624; and Voltage Driver 626.

In this example, the serial transmit bit stream, TBS, is first assigned into groups of three bits in Serial to 3 b Parallel block 604, and then encoded through a 3-bit to 4-bit Encoder block 606 to maintain current and voltage balance of the transformer drive. Encoding increases the rate of the transmit data, for example, assuming the data rate of the transmit bit stream, TBS, is at 1.536 Mbps, the data rate across the barrier becomes, after 3 bit to 4 bit conversion and Manchester coding, 1.536 Mbps×4/3×2=4.096 Mbps.

Composite signal, CTL, which in one embodiment is the power signal modulated by control data may be time-division-multiplexed with the transmit bit stream and sent across the barrier to LIC 108 from the HIC 104. When transfer of control data is necessary, the control data bit (i.e. CTL) may be encoded as follows: "0" may be encoded as "xx0101xx" and "1" may be encoded as "xx1010xx" in block 602. The resulting encoded CTL data and TBS data are time-division multiplexed in Mux 608 and then Manchester encoded in block 616 to generate the transmit data, TXD, which is driven across the barrier by Voltage Driver 626.

Figure 7:
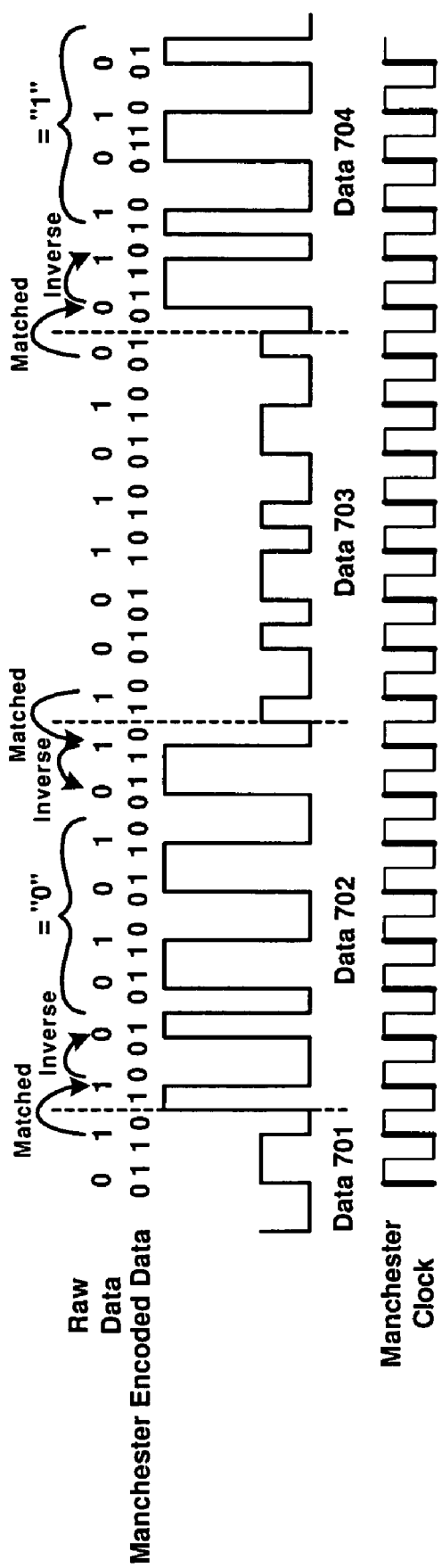
FIG. 7 is a signal diagram illustrating encoding of control and data in accordance with an embodiment of the present invention.

FIG. 7 is an illustration of encoding control and data in accordance with an embodiment of the present invention. As illustrated, Data 701 represents data to be transmitted; Data 702 represents a control value of "0"; Data 703 represents data to be transmitted; and Data 704 represents a control value of "1". Since in one embodiment, one bit of control data and six TBS bits are alternately transferred across the barrier, the effective control data transfer rate is one-twelfth the rate of the transmit bit stream (i.e., one-sixth for bit rate and one-half for Manchester encoding, e.g., 1.536 Mbps/6/2=128 Kbps.).

Referring back to FIG. 6, the receive data, RXD, may be decoded by isolating the transformer current, Itotal, into two components: Ihat, the magnetizing current; and Iterm, the load current. A current feedback path comprising elements 618, 620, 622 and 624, acts to cancel the magnetizing inductance current, Ihat, by forcing Ixid to equal Ihat so that the receive data may be detected and extracted from Ixvd (e.g. if Ixid=Ihat then Ixvd=Iterm).

As illustrated, Receive Detector 618 decodes the receive data and generates the loop error. The receive detector may comprise a load current processing circuit and a threshold detector, for example. Thus, if the load current is below the known threshold, the receive data is zero ("0"), otherwise it is one ("1"). Proper operation of the threshold detector may require the ratio of the magnetizing inductance over the voltage driver source impedance (e.g. time constant) to be much greater than the bit period to prevent decay of the signal during each sample period.

Figure 8:
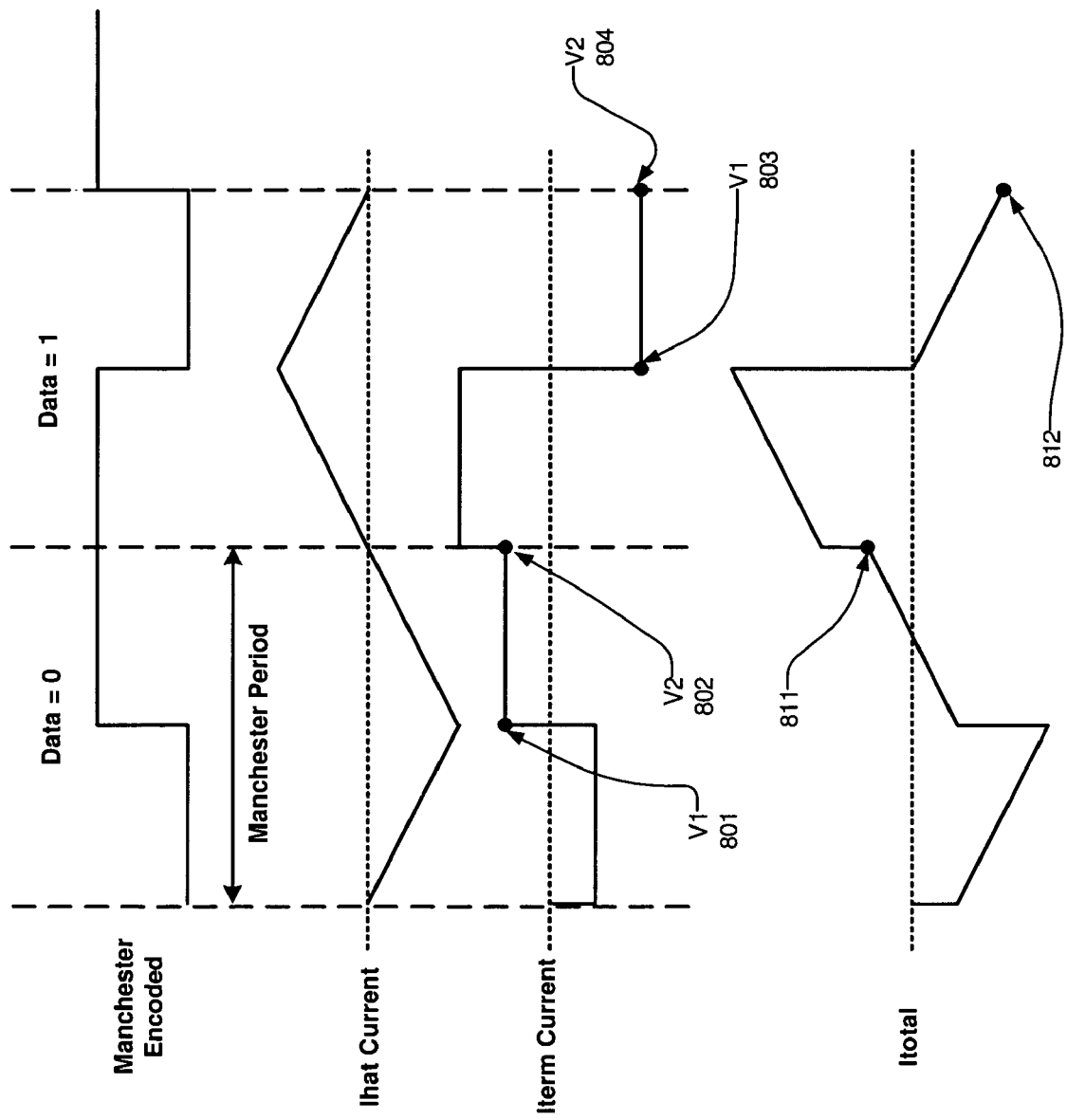
FIG. 8 is a signal diagram illustrating one or more methods for decoding of receive data in accordance with an embodiment of the present invention.

Example waveforms for transmit data (Manchester encoded), and corresponding currents Ihat, Iterm and Itotal are shown in FIG. 8. The loop error may be generated by sampling and comparing the sourced current, Ixvd, at timing points labeled V1 801, V2 802, V1 803, and V2 804, as illustrated in FIG. 8.

The voltage values, which are proportional to the sourced current, Ixvd, are available through the feedback loop (e.g., VMR). In one embodiment, the error signal is generated by computing the difference between the voltages V2 and V1 (i.e. Error=V2−V1). The Error Integrator 620 integrates the error to drive the voltage error to zero through the feedback path. Current generator 622 generates the necessary current from the integrated error signal and Current Driver 624 (e.g. high impedance driver) drives the current, Ixid (e.g. such that Ixid equal to Ihat), thus canceling the magnetizing inductance current from Itotal to substantially isolate the load current component in Ixvd.

Referring to FIG. 8, the receive signal RXD may be decoded by sampling the current Ixvd (via sensing voltage VMR) at any time in the bit period, and comparing the magnitude of the sensed value against a threshold. The threshold may be derived, for example, from the average of the two sensed levels corresponding to the two impedance values. In other embodiments, the threshold may be preset.

In another embodiment, feedback elements 620, 622 and 624 are omitted from the circuit, and the magnetizing inductance current is left uncanceled. In this embodiment, the predictable nature of the magnetizing inductance current is used to sample the total sourced input current, Itotal, at opportune intervals when the magnetizing inductance current is at or near zero, allowing the load current to dominate. For example, with Manchester encoding of the transmit data, the magnetizing inductance current is near zero magnitude near the transition between consecutive bit periods. The receive data RXD may therefore be detected by sampling the voltage VMR at or near the end of the bit period or at or near the beginning of the bit period, as represented by sample points 811 and 812 in FIG. 8.

After decoding, the receive signal RXD is separated (e.g. demultiplexed) into data and status information in block Demux 614. The data portion comprises of six bits which may subsequently be serialized in block Serializer 610 into the receive bit stream, RBS. In addition, the status bit may be written sequentially into Status Register 612 to create an 8-bit wide status word, STA.

Figure 10:
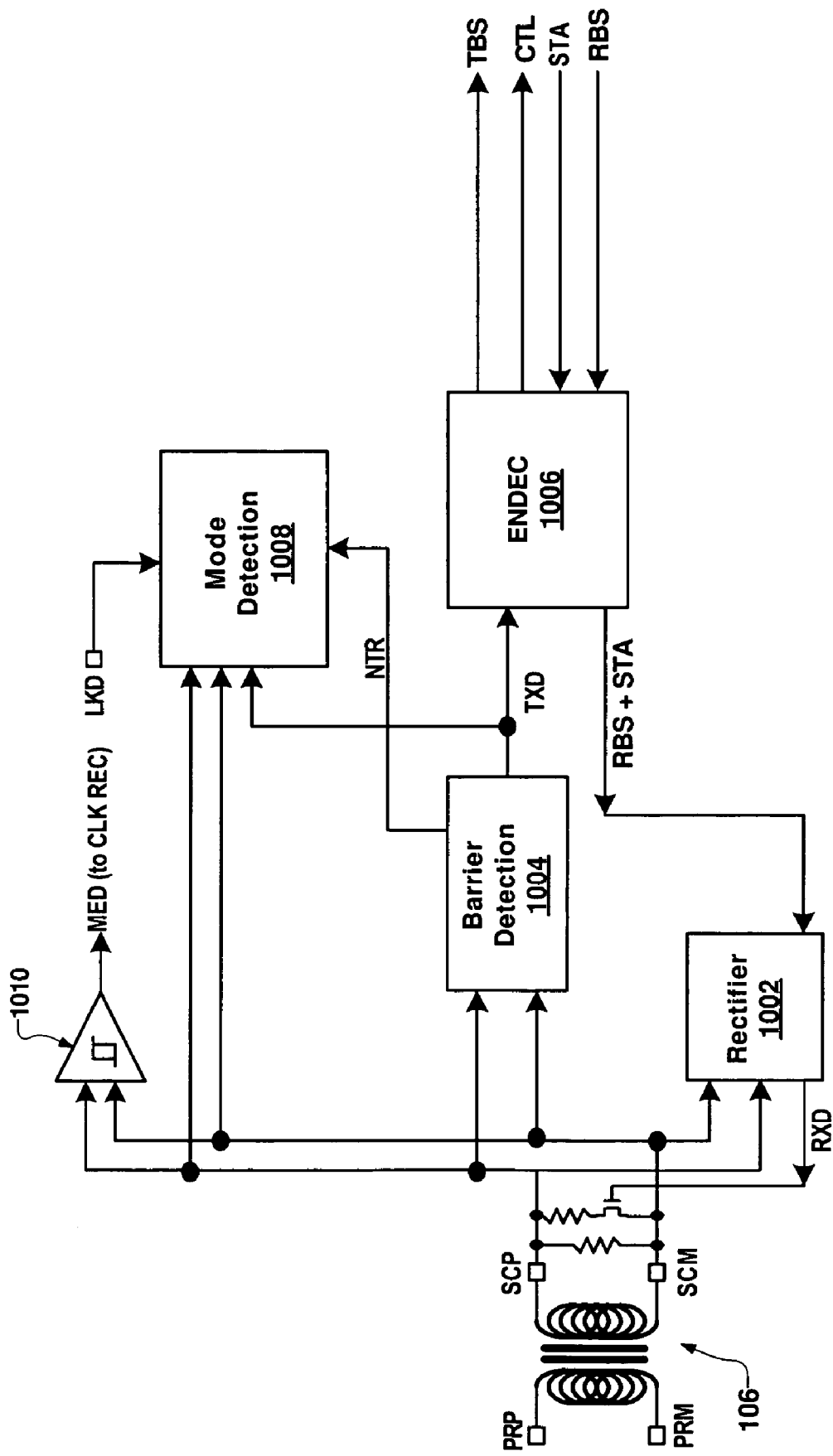
FIG. 10 is a block diagram of a Line Side Barrier Interface in accordance with an embodiment of the present invention.

FIG. 10 is a functional illustration of the Line Side Barrier Interface (LSBI) 902 in accordance with an embodiment of the present invention. As illustrated, LSBI 902 comprises Rectifier 1002; Barrier Detection 1004; Encoder/Decoder (ENDEC) 1006; Mode Detection 1008; and amplifier 1010. Amplifier 1010 sends the transmitted Manchester Encoded Data (MED) to the clock recovery loop.

In one embodiment, the barrier transformer 106 and the rectification scheme in Rectifier 1002 are such that 3V pulses from the HIC 104 will become 6V pulses to the LIC 108. The 6V pulses are rectified by the Rectifier 1002, which could be a diode bridge or any other rectification scheme (e.g. active or passive), on pins SCP and SCM of the transformer 106 to generate a positive supply voltage, VPS, for the LIC 108. In practice, the generated voltage, VPS, may be closer to 3.0V, due to finite impedance of the HIC transformer drivers, losses in the transformer, and other parasitics. A capacitor (e.g., 0.1 uF) may be used to store the rectified voltage.

Barrier Detection 1004 performs raw data detection from the signal at the terminals, SCP and SCM, of the transformer. Barrier Detection 1004 may also assert a no transition flag, NTR, when there is a lack of transitions for more than a specified period of time (e.g. 200 microseconds). The no transition flag assertion results in resetting LSFSM 906, through a command from Mode Detection block 1008, thus shutting off analog power consumption. Mode Detection block 1008 also identifies the operating modes issued by HIC 104 through the CTL command.

In one embodiment, LSBI 902 identifies the state of operation by monitoring the transmit data stream, TXD, coming across the barrier from HIC 104 by checking the number of power pulses and the data pulses (e.g., power pulses may be transmitted with a higher voltage than data pulses). For instance, the modes of operation may comprise a mixed mode, a data mode, an idle mode, and a reset mode.

In Mixed mode, power transmission and full-duplex data transfer may be time domain multiplexed. From reset until the assertion of an Off Hook command, HIC 104 may operate in a "Mixed Mode". During the Mixed mode, the HIC 104 may supply power to LIC 108 across the pulse transformer barrier. In some embodiments, HIC 104 may continue to deliver power to LIC 108 even after the off hook command is asserted.

In Data mode, transmit and receive data may be simultaneously and continuously exchanged between the LIC 108 and HIC 104 at maximum data rates. In Idle mode, power transmission and Wake-On-Ring sensing may be time domain multiplexed. The power may be transmitted directly at the clock rate while Wake-on-Ring may be sensed at a much slower rate than the clock rate. In Reset mode, no communication takes place, thus power dissipation may be minimized.

Figure 11:
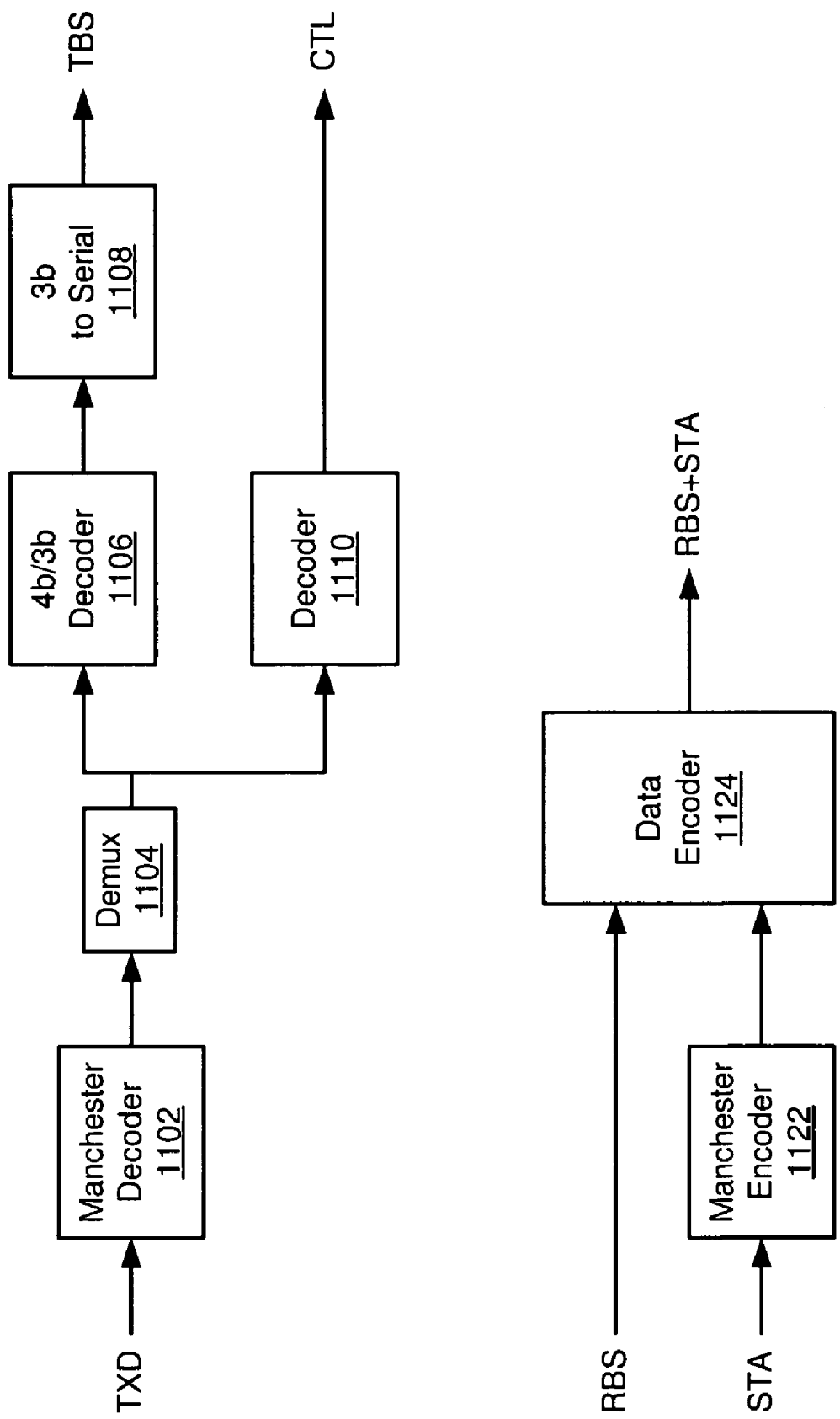
FIG. 11 is a block diagram of an Encoder/Decoder in accordance with an embodiment of the present invention.

Encoder/Decoder (ENDEC) 1006 performs decoding of the transmit data into CTL and TBS and performs a 4-bit to 3-bit conversion of the TBS. Thus, the ENDEC 1006 performs the reverse of the encoding process used to generate TXD on the Host Side, HIC 104, which was discussed with respect to FIG. 6. FIG. 11 is a functional illustration of an Encoder/Decoder 1006 in accordance with an embodiment of the present invention.

As illustrated, transmit data, TXD, is Manchester decoded in block 1102 and then demultiplexed in block 1104 into a data portion and a control portion. The data portion is processed through a 4 b/3 b decoding scheme (reverse of 3 b/4 b discussed with respect to FIG. 5) in block 1106. The resulting 3-bit data is serialized in block 1108 into the recovered transmit bit stream, TBS. In addition, the control portion is decoded in block 1110 to generate the control bit, CTL.

ENDEC 1006 also encodes the receive data, RBS, from the Analog to Digital Converter (ADC+FILT) 908 and the status bit to generate the composite signal RBS+STA. As illustrated, the status bit STA is Manchester encoded in block 1122 and then combined with the receive bit stream, RBS, in block 1124.

Figure 12:
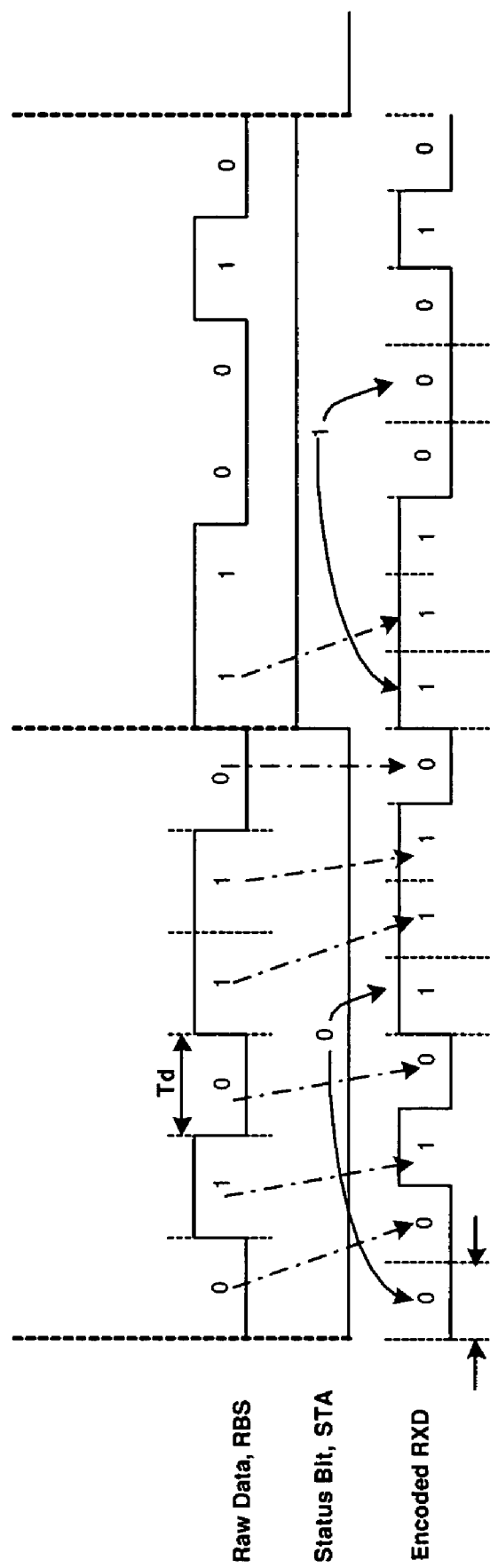
FIG. 12 is a signal diagram illustrating the encoding of receive data in accordance with an embodiment of the present invention.

In blocks 1122 and 1124, the data, RBS, and the Status bit, STA, are encoded for transmission across the barrier. In one embodiment of the present invention, the encoding scheme first does Manchester encoding of the Status bit into two bits in block 1122 and places one of the bits at the beginning of three of six bits of data and the other at the beginning of the remaining three of the same six data bits in block 1124. This is further illustrated graphically in FIG. 12. Note that special encoding of the RBS bits is not required.

When detected in HIC 104, the received serial bits are properly framed and decoded into 7 bits of data –6 bits of modem data and 1 bit of control data. The Status bit rate is one sixth of the RBS rate. For instance, if RBS rate is 1.536 Mbps then STA rate will be 256 Kbps.

Clock Recovery

Figure 13:
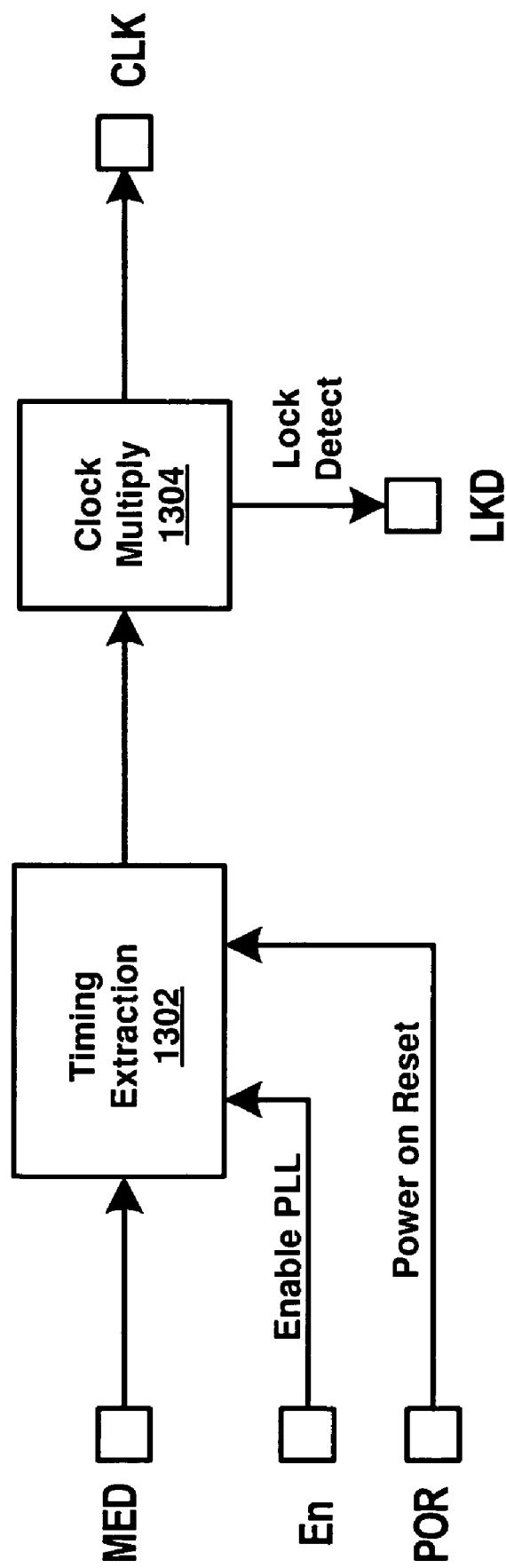
FIG. 13 is block diagram of a clock recovery circuit in accordance with an embodiment of the present invention.

FIG. 13 is an illustration of the clock recovery circuit in accordance with an embodiment of the present invention. As illustrated, clock recovery in the LIC 108 may be performed by a Phase Lock Loop (PLL) comprising a timing extraction block 1302 and clock multiply block 1304. Upon enablement, timing extraction block 1302 determines the frequency range of the input MED (i.e. Manchester Encoded Data) and properly sets up the Phase Lock Loop. When the PLL locks onto the MED frequency, the signal LKD is asserted and sent to LSBI 902.

The range of frequency associated with the input, MED, may vary significantly. For instance, it may be at 1 MHz when the sampling rate, Fs, is 8 kHz, but can also be as large as 4 MHz with Fs=16 kHz. Thus, the clock recovery circuit may be capable of dealing with any desired frequency range.

Figure 15A:
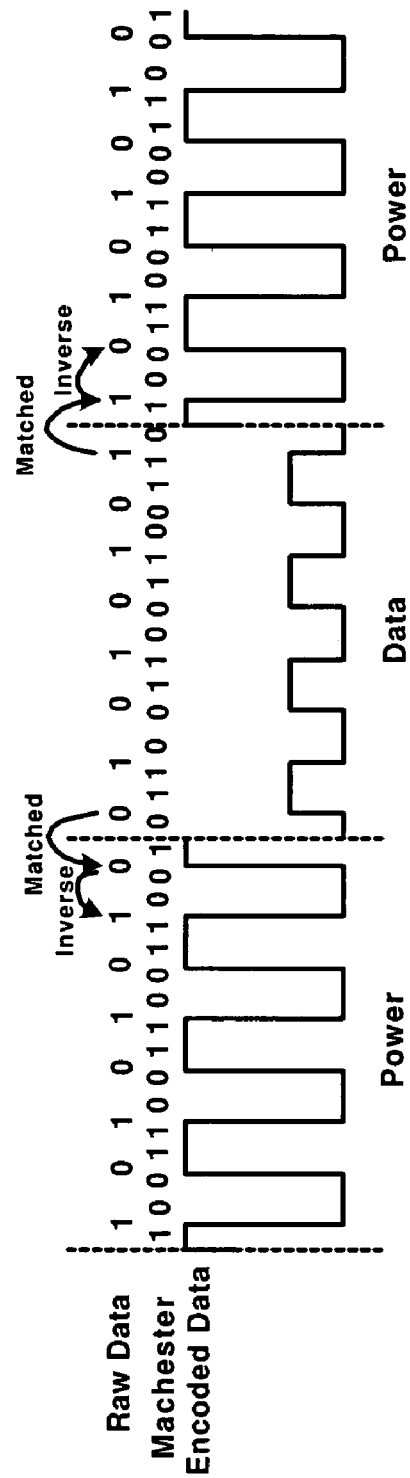
FIG. 15A is a signal diagram illustrating representative preamble pulses for clock recovery lock in accordance with an embodiment of the present invention.

To set up the clock recovery circuit, the HIC 104 may send a preamble containing only clock and power pulses as shown in FIG. 15A.

Figure 15B:
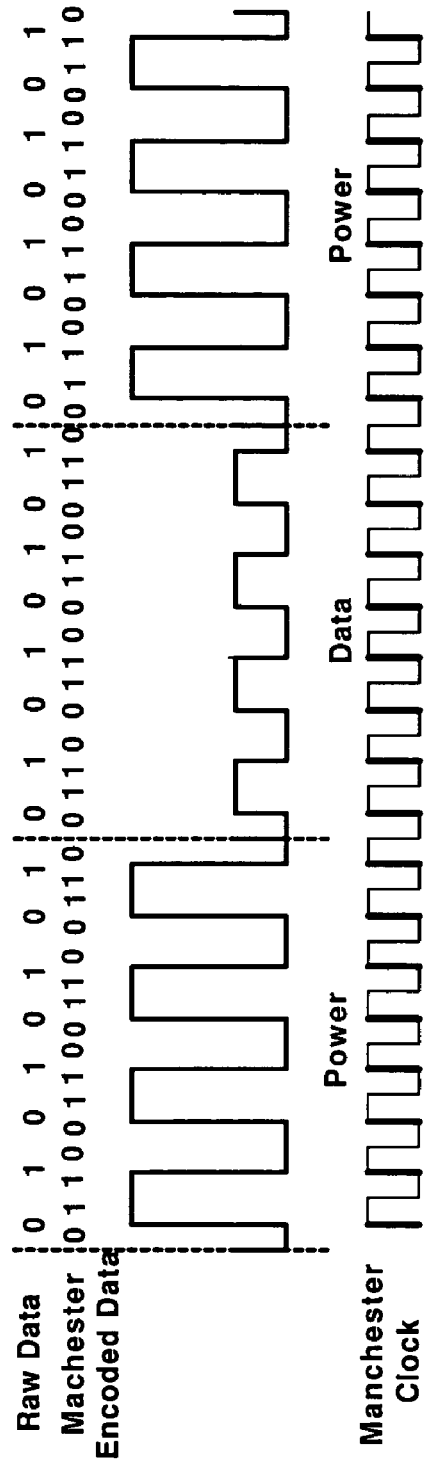
FIG. 15B is a signal diagram illustrating inversion of the preamble pulses for clock recovery lock in accordance with an embodiment of the present invention.

In an embodiment, LSBI 902 first inverts the power pulses to make them a true alternating preamble as shown in FIG. 15B (Manchester transitions are highlighted in bold). After inversion, the pulse train becomes a seamless preamble pattern at half the frequency of the Manchester clock, i.e. transitions only occur at the rising edge of the Manchester clock. The Timing Extraction circuit 1302 auto detects the approximate frequency range of the inverted preamble. This information is then used by the PLL to properly set the PLL parameters.

Figure 14:
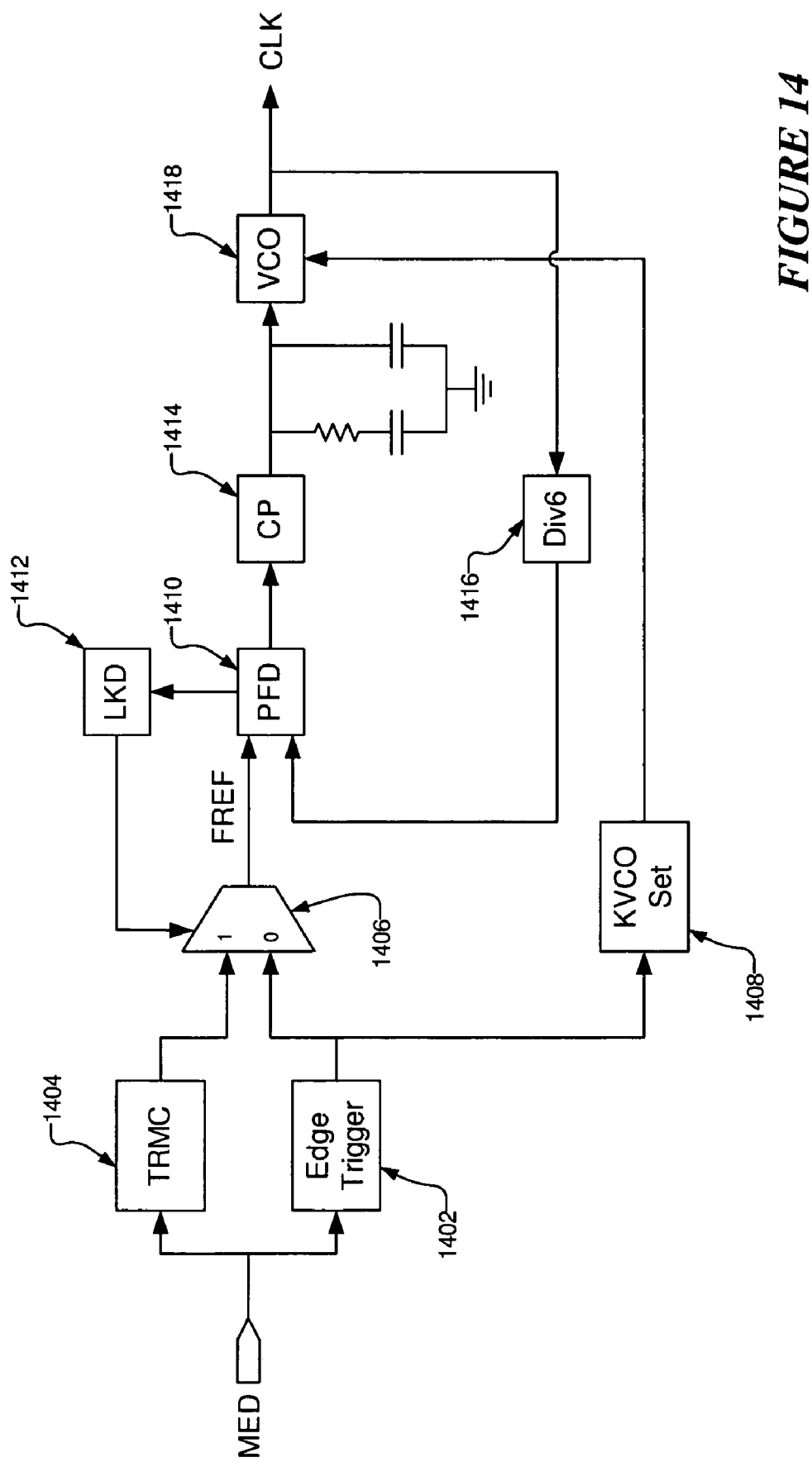
FIG. 14 is a block diagram of a PLL (phase-locked loop) in accordance with an embodiment of the present invention.

FIG. 14 is a detailed illustration of the PLL in accordance with an embodiment of the present invention. The clock recovery PLL comprises an edge trigger block 1402 that generates a one-shot at every edge of MED; Timing Recovery Manchester Encoder block (TRMC) 1404; switch 1406; phase detector (PFD) 1410; Voltage Controlled Oscillator gain determination block (KVCO Set) 1408; lock determination block (LKD) 1412; Voltage Controlled Oscillator (VCO) 1418; clock divider block (Div6) 1416; and Charge Pump (CP) 1414.

In one embodiment of the present invention, there are three steps involved in acquiring a clock (CLK) that is locked to Manchester Encoded Data. The first step is to estimate the required KVCO settings (KVCO 1408) for the PLL for a given input clock (preamble) represented by the input MED. This may be accomplished by enabling KVCO counters in the clock extraction block to start counting at a rate of twice the input frequency for a specific period.

The two times input frequency may be generated by passing the MED input signal through Edge Trigger block 1402, which performs a one-shot at both edges of the input signal, thereby generating a signal at twice the frequency. After counting is complete, the entire PLL is powered up and the final results of the counters are used to set the KVCO control bits. During the counting time of the preamble, the generated double input frequency signal at block 1402 may be used as the reference frequency (FREF) to the PLL.

Second, after setting the PLL KVCO control bits and powering up the entire PLL, the PLL begins the process of locking to MED (still Preamble). When PLL has successfully acquired lock, LKD signal goes high, as determined in block 1412.

Third, once LKD signal goes high, FREF to the PLL may switch from the bi-directional one-shot 1402 to the output of Timing Recovery Manchester Encoder block (TRMC) 1404 which selects the valid Manchester transition edges. This switching happens smoothly without glitch. Assertion of the signal LKD may also be used to signal the LSBI 902 that it can start sending data instead of preamble clock to the MED.

Finally, CLK is the Recovered Manchester clock that runs at multiple times faster (e.g. six times faster if Div6=6) than FREF (i.e. CLK=6*FREF). Also, the rising edge of the recovered Manchester clock is aligned with the valid data transition. Note that a different clock speed may be generated by changing the clock divider value in block 1416. The recovered clock signal may then be used in all circuitry on the line side requiring timing information (e.g., an ADC in block 908 and ENDEC block 1006).

Power Supply and Regulation

Regulator 916 may regulate the voltage obtained from the telephone line to generate the proper digital positive supply voltage level, VPS, required to power all circuit devices on the line side (LIC 108) requiring power during modes when power is available from the telephone line. Voltage regulator 916 drives transistor Q5 when needed to obtain the sensed input voltage SRE.

In one embodiment, voltage regulation for the line side device, LIC 108, is performed by Regulator 916. Voltage regulator schedules power supply source to minimize Host power consumption. For example, since power may not be available from the line when the phone is on-hook, voltage regulator 916 may provide the power supply from the barrier (i.e. from power developed by Rectifier 1002). However, when power is available from the phone line, e.g., when phone is off-hook, voltage regulator 916 may switch to provide the power supply from the line, if so desired.

Figure 16:
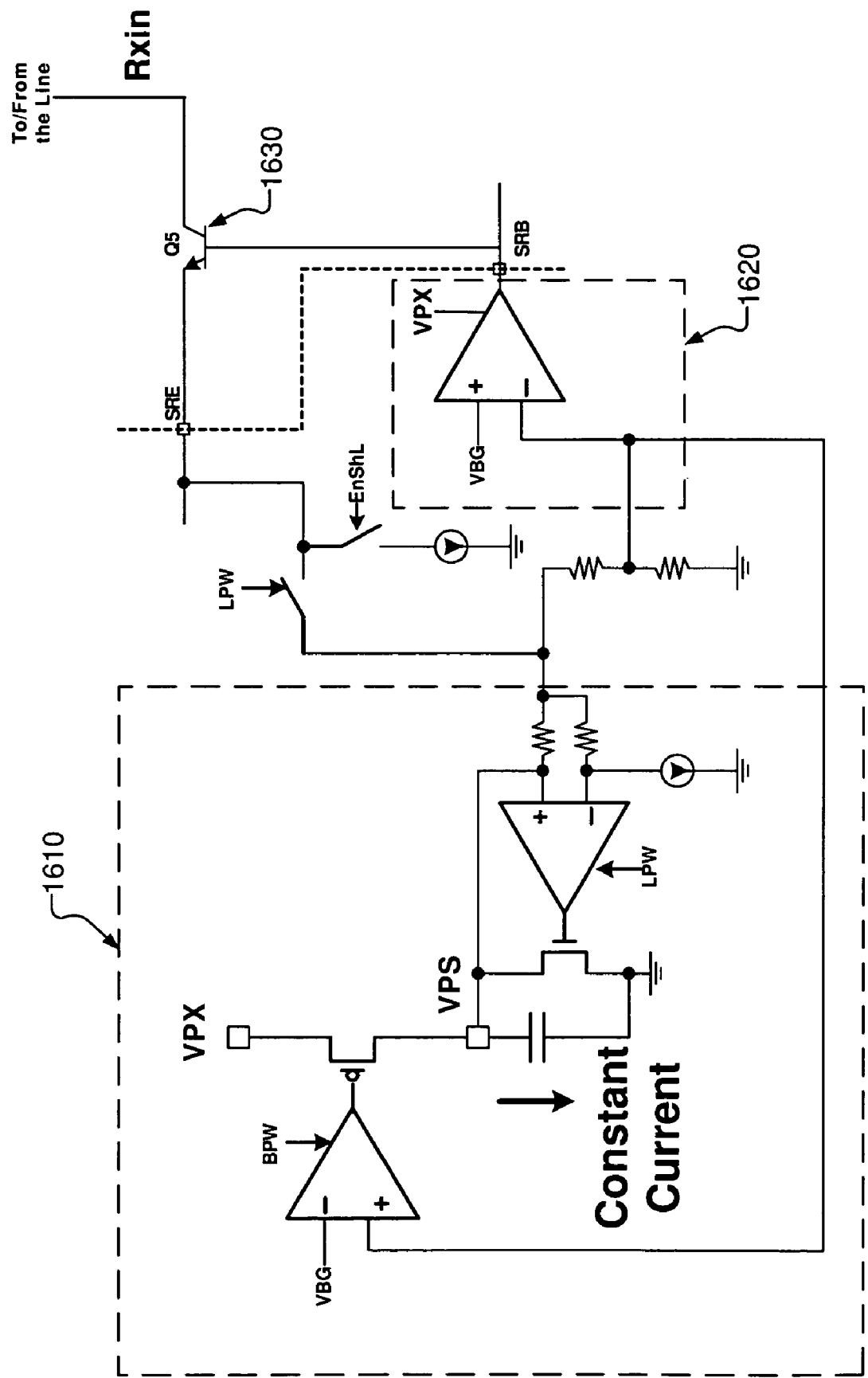
FIG. 16 is a circuit diagram of a power regulation scheme in accordance with an embodiment of the present invention.

In the line power mode, one embodiment of the regulator 916 includes circuits 1610 and 1620 of FIG. 16. Circuit 1610 shunt-regulates the current sourced out of VPS to a preset value, while circuit 1620 regulates the drive voltage to the base, SRB, of the external "Cascode" NPN transistor Q5 1630 such that its emitter, SRE, is held at a prescribed voltage. The voltage at the emitter, SRE, becomes essentially the power supply voltage (VPS) for the entire device. Since the base voltage, SRB, is higher than its emitter by a diode voltage, a charge pump may be included in circuit 1620 to boost the voltage to the base, SRB.

Figure 17:
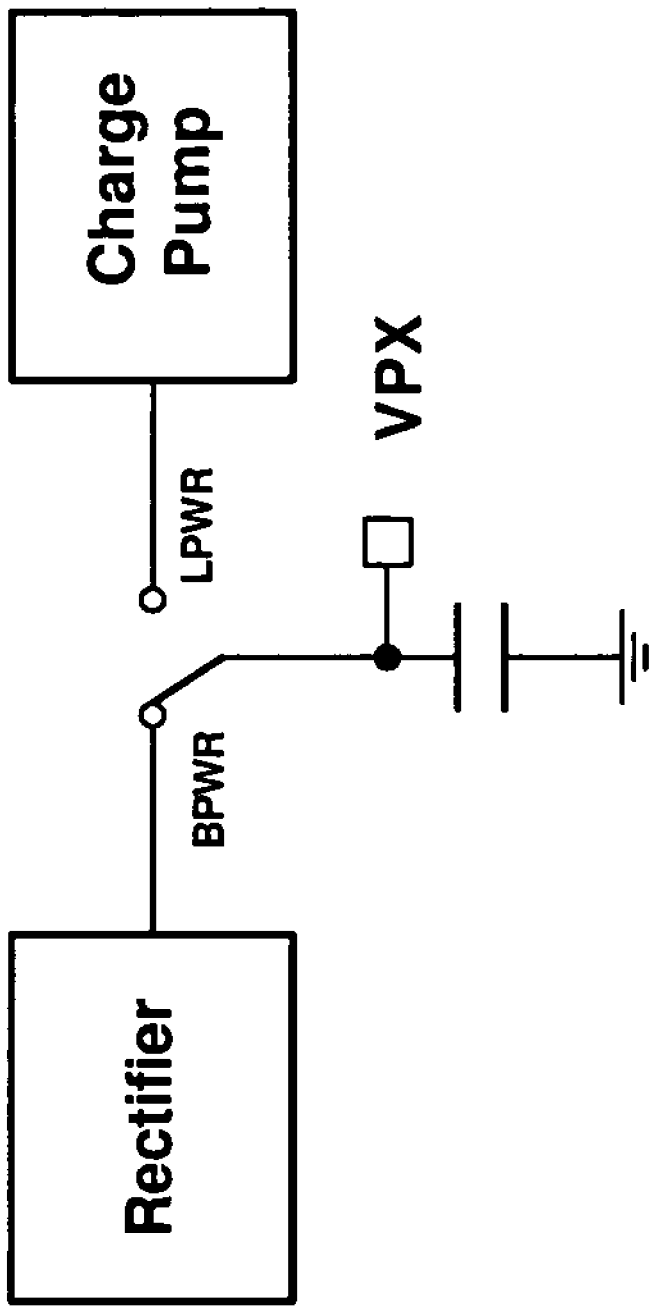
FIG. 17 is a block diagram illustrating the switching between line power and barrier power for supplying the line side devices in accordance with an embodiment of the present invention.

In one embodiment, the voltage VPX may be developed off the barrier when the DAA is operating in a mode when power is transferred from the HIC 104 to the LIC 108. However, when power is available from the phone line, VPX may be developed off a charge pump as shown in FIG. 17. The charge pump may be designed to generate enough voltage to drive the base (i.e. SRB) of cascode transistor Q5 1630.

Thus, a method and apparatus for full duplex signaling across a transformer have been described. Particular embodiments described herein are illustrative only and should not limit the present invention thereby. The invention is defined by the claims and their full scope of equivalents.

The invention claimed is:

1. An apparatus comprising:
   an transformer having a primary side and a secondary side;
   a first circuit coupled to said primary side of said transformer and to a source of transmit data, said first circuit configured to encode said transmit data into a transmit data stream that has DC balanced current and DC balanced voltage characteristics, said first circuit further configured to drive said transmit data stream across said transformer; and
   a second circuit coupled to said secondary side of said transformer and to a source of receive data, said second circuit configured to detect said transmit data stream and to modulate load impedance on said secondary side based on said receive data;
   wherein said first circuit is further configured to provide source current to satisfy said load impedance and to isolate magnetizing inductance current of said transformer from said sourced current.

2. The apparatus of claim 1, wherein said transformer is an element of an isolation barrier.

3. The apparatus of claim 1, wherein said first circuit comprises one or more DC-balanced encoders.

4. The apparatus of claim 3, wherein said one or more DC-balanced encoders comprises a Manchester encoder.

5. The apparatus of claim 3, wherein said one or more DC-balanced encoders comprises a 3B/4B encoder.

6. The apparatus of claim 1, wherein said first circuit comprises a current sensor configured to detect said impedance modulation.

7. The apparatus of claim 6, wherein said current sensor is configured to sample said sourced current when said magnetizing inductance current of said transformer is near a minimum magnitude.

8. The apparatus of claim 6, wherein said first circuit further comprises a current feedback loop configured to cancel said magnetizing inductance current of said transformer.

9. The apparatus of claim 1, wherein said second circuit comprises an impedance circuit with a plurality of switchable impedance values.

10. The apparatus of claim 9, wherein said impedance circuit comprises:
    a first impedance;
    a switch in series with said first impedance; and
    a second impedance in parallel with said first impedance and said switch.

11. The apparatus of claim 10, wherein said first impedance and said second impedance comprise a first resistor and a second resistor, respectively.

12. The apparatus of claim 10, wherein said switch comprises a FET transistor.

13. An apparatus comprising:
    an transformer having a primary side and a secondary side;
    a first circuit coupled to said primary side of said transformer and to a source of transmit data, said first circuit configured to encode said transmit data into a transmit data stream that has DC balanced current and DC balanced voltage characteristics, said first circuit further configured to drive said transmit data stream across said transformer, said first circuit further configured to isolate magnetizing inductance current of said transformer from a source current, said first circuit further configured with a current sensor to detect changes in values of load impedance on said secondary side by measuring said source current; and
    a second circuit coupled to said secondary side of said transformer and to a receive data source, said second circuit configured to detect said transmit data stream and to modulate said load impedance on said secondary side based on said receive data.

14. The apparatus of claim 13, wherein said current sensor is configured to sample said sourced current when said magnetizing inductance current of said transformer is near a minimum magnitude.

15. The apparatus of claim 13, wherein said first circuit further comprises a current feedback loop configured to cancel said magnetizing inductance current of said transformer.

16. An apparatus comprising:
    an transformer having a primary side and a secondary side;
    a first circuit coupled to said primary side of said transformer and to a source of transmit data, said first circuit configured to encode said transmit data into a transmit data stream that has DC balanced current and DC balanced voltage characteristics, said first circuit further configured to drive said transmit data stream across said transformer, wherein said first circuit is further configured to measure changes in load impedance on said secondary side of said transformer; and
    a second circuit coupled to said secondary side of said transformer and to a receive data source, said second circuit configured in detect said transmit data stream; said second circuit further configured with a load impedance circuit having a switch controlled by said receive data for modulating said load impedance between a plurality of values.

17. The apparatus of claim 16, wherein said load impedance circuit comprises:
    a first impedance circuit coupled in series with said switch; and
    a second impedance circuit coupled in parallel with said first impedance circuit and said switch.

18. The apparatus of claim 17, wherein said first impedance circuit and said second impedance circuit comprise a first resistor and a second resistor, respectively.

19. The apparatus of claim 16, wherein said switch comprises a FET transistor.

* * * * *